US011987195B2

(12) United States Patent
Nilsson et al.

(10) Patent No.: US 11,987,195 B2
(45) Date of Patent: May 21, 2024

(54) VEHICLE SEAT PARTITIONING SYSTEM AND VEHICLE COMPRISING A VEHICLE SEAT PARTITIONING SYSTEM

(71) Applicant: Ningbo Geely Automobile Research & Development Co., Ltd., Ningbo (CN)

(72) Inventors: Magnus Nilsson, Floda (SE); Jonathan Johansson, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 327 days.

(21) Appl. No.: 17/553,106

(22) Filed: Dec. 16, 2021

(65) Prior Publication Data
US 2022/0105891 A1 Apr. 7, 2022

Related U.S. Application Data

(63) Continuation of application No. PCT/CN2020/099264, filed on Jun. 30, 2020.

(30) Foreign Application Priority Data

Jul. 8, 2019 (EP) .................................... 19185014

(51) Int. Cl.
*B60R 21/02* (2006.01)
*B60N 2/20* (2006.01)

(52) U.S. Cl.
CPC ............ *B60R 21/026* (2013.01); *B60N 2/206* (2013.01); *B60N 2205/35* (2013.01); *B60R 2021/0293* (2013.01)

(58) Field of Classification Search
CPC ............. B64D 11/0606; B60N 2/206; B60N 2205/35; B60R 21/026; B60R 2021/0293
See application file for complete search history.

(56) References Cited

U.S. PATENT DOCUMENTS 6,260,903 B1 * 7/2001 von der Heyde ...... B60N 2/286
296/64
10,059,238 B1 8/2018 Salter
(Continued)

FOREIGN PATENT DOCUMENTS

DE          19541567 C1   1/1997
DE       102012011430 A1  2/2012
(Continued)

OTHER PUBLICATIONS

International Search Report from corresponding International Application No. PCT/CN2020/099264, dated Oct. 12, 2020, 2 pages.

*Primary Examiner* — Lori Lyjak
(74) *Attorney, Agent, or Firm* — Tucker Ellis LLP

(57) ABSTRACT

A vehicle seat partitioning system includes a partition structure attached to a first and a second backrest structure of a vehicle seat unit. The first and/or second backrest structure are arranged to be foldable between raised and lowered positions in relation to a common seating structure. The partition structure has a first and a second side edge, the first side edge connected to the first backrest structure and the second side edge connected to the second backrest structure. The system further includes a first track unit arranged on the first backrest structure and/or a second track unit arranged on the second backrest structure. The first side edge has a first connection member connected to and movably arranged in relation to the first track unit and/or the second side edge has a second connection member connected to and movably arranged in relation to the second track unit.

15 Claims, 8 Drawing Sheets

(56) References Cited

U.S. PATENT DOCUMENTS

| | | | |
|---|---|---|---|
| 10,479,506 B1 | 11/2019 | Colletti | |
| 2004/0004382 A1* | 1/2004 | Dowty | B64D 11/06 297/354.1 |
| 2009/0058154 A1 | 3/2009 | Stojanovic | |

FOREIGN PATENT DOCUMENTS

| | | |
|---|---|---|
| FR | 2989649 A1 | 10/2013 |
| JP | 2000095001 A | 4/2000 |
| JP | 2010018153 A | 1/2010 |

* cited by examiner

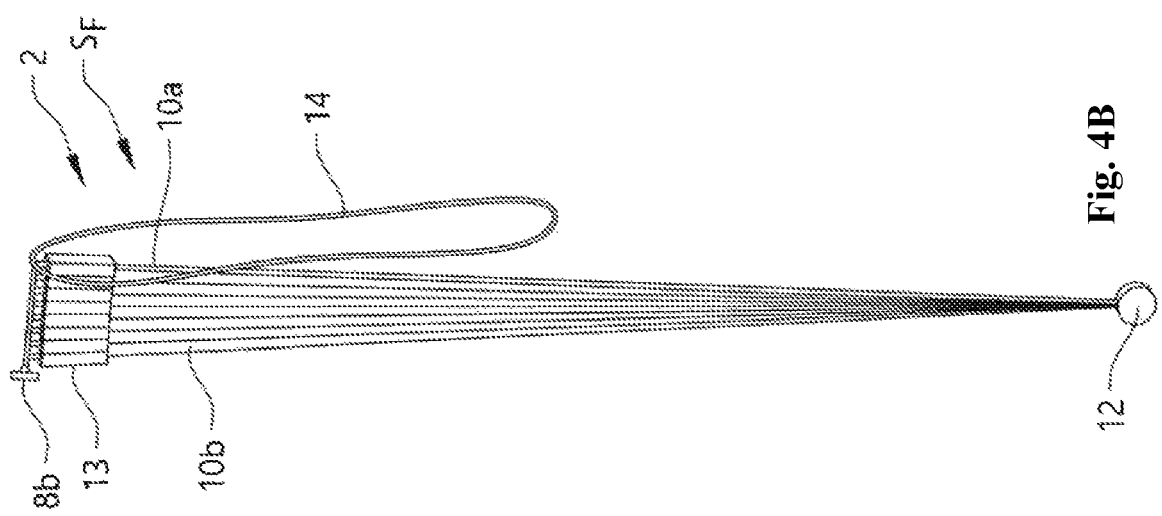
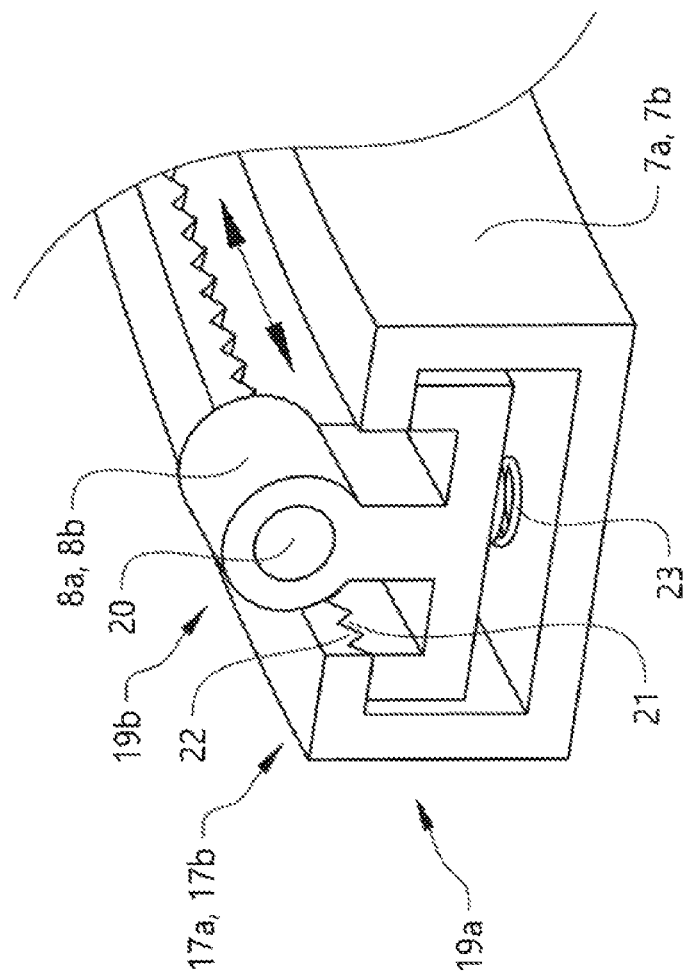
Fig. 4B
Fig. 5

US 11,987,195 B2

VEHICLE SEAT PARTITIONING SYSTEM AND VEHICLE COMPRISING A VEHICLE SEAT PARTITIONING SYSTEM

RELATED APPLICATION DATA

This application is a continuation of International Patent Application No. PCT/CN2020/099264, filed Jun. 30, 2020, which claims the benefit of European Patent Application No. 19185014.8, filed Jul. 8, 2019, the disclosures of which are incorporated herein by reference in their entireties.

TECHNICAL FIELD

The present disclosure relates to a vehicle seat partitioning system comprising a partition structure. The partition structure is attached to a first backrest structure and a second backrest structure of a vehicle seat unit. The first backrest structure and/or the second backrest structure are arranged to be foldable between a raised position and a lowered position in relation to a common seating structure. The disclosure further relates to a vehicle comprising a vehicle seat partitioning system.

BACKGROUND

Flexible interior vehicle solutions are commonly integrated in modern passenger vehicles. One example is vehicle seat units with foldable backrest constructions allowing a user of the vehicle to increase the cargo space for convenient loading of the vehicle. The rear side of the backrest may be used in a folded state as a cargo floor. Another example is net structures or similar constructions preventing cargo from being shifted during transport, and preventing passengers of the vehicle from being hit by objects during transport or in a crash event. When folding a part of a vehicle backrest structure there is a risk that a passenger riding in the unfolded section of the vehicle seat unit is being hit by objects, since traditional cargo net structures are not preventing objects from being displaced from the cargo compartment to the passenger compartment. This is especially of concern if the objects are not secured properly with for example cargo straps or other load securing means.

There is thus a need for an improved solution preventing passengers from being hit by objects during transport or in a crash event. Further, there is a need for solutions preventing cargo from being shifted during transport when a backrest structure of a vehicle seat unit is folded.

SUMMARY

An object of the present disclosure is to provide a vehicle seat partitioning system and a vehicle comprising a vehicle seat partitioning system where the previously mentioned problems are avoided. This object is at least partly achieved by the features of the independent claims. The dependent claims contain further developments of the vehicle seat partitioning system and the vehicle.

The disclosure concerns a vehicle seat partitioning system comprising a partition structure, where the partition structure is configured to be attached to a first backrest structure and a second backrest structure of a vehicle seat unit. The first backrest structure and/or the second backrest structure are arranged to be foldable between a raised position and a lowered position in relation to a common seating structure. The partition structure comprises a first side edge and a second side edge, where the first side edge is configured to be connected to the first backrest structure and the second side edge is configured to be connected to the second backrest structure. The system further comprises a first track unit configured to be arranged on the first backrest structure and/or a second track unit configured to be arranged on the second backrest structure. The first side edge comprises a first connection member connected to and movably arranged in relation to the first track unit and/or the second side edge comprises a second connection member connected to and movably arranged in relation to the second track unit.

Advantages with these features are that the interior structure and the vehicle seat unit of the vehicle can be designed in a more safe way for passengers riding in the vehicle. The vehicle seat partitioning system with movable connection members in relation to the track units is providing a way to displace the partition structure when one of the backrest structures are folded. The partition structure is preventing goods or objects from hitting passengers in the vehicle during transport or in a crash event, and through the displacement of the partition structure, a flexible solution is provided where goods or objects of different sizes and shapes can be prevented from being moved during transport. Further, the partition structure can be used for preventing cargo from being shifted during transport when a backrest structure of the vehicle seat unit is folded.

According to an aspect of the disclosure, the first side edge is configured to extend along a first backrest side edge of the first backrest structure, and the second side edge is configured to extend along a second backrest side edge of the second backrest structure. The first backrest side edge and the second backrest side edge are arranged in connection to each other when the first backrest structure and the second backrest structure are arranged in the raised position, or arranged in the lowered position. The arrangement of the side edges of the partition structure along adjacent backrest side edges is providing a simple design of the system preventing goods from being displaced when one of the backrest structures are folded and a compact arrangement when the backrest structures are unfolded.

According to another aspect of the disclosure, the partition structure is configured to be arranged in a folded state when the first backrest structure and the second backrest structure are arranged in the raised position, or arranged in the lowered position. The folded state is providing a compact arrangement of the vehicle seat partitioning system when the partition structure is not being used.

According to an aspect of the disclosure, the partition structure is configured to be arranged in an unfolded state when the first backrest structure is arranged in the raised position and the second backrest structure is arranged in the lowered position, or when the first backrest structure is arranged in the lowered position and the second backrest structure is arranged in the raised position. The unfolded state is used for preventing gods or objects from hitting a passenger or for preventing that the objects are moved during transport, through the partitioning of the vehicle seat unit. The system is designed for an easy operation between the folded state and the unfolded state. When one of the backrest structures is being lowered, the partition structure unfolds from the folded state to the unfolded state. When the backrest structure is returned to its raised position, the partition structure is folded from the unfolded state to the folded state.

According to another aspect of the disclosure, the partition structure has a flexible fan-like configuration, where the partition structure comprises two or more stiffening ribs. The stiffening ribs are extending between an outer side edge of the partition structure and an inner section of the partition structure, where the inner section is connecting the first side edge and the second side edge. The stiffening ribs are providing a safe construction of the partition structure, where the ribs are preventing goods from being displaced. The flexible fan-like configuration with stiffening ribs is further providing a construction and design that is simple to arrange between the folded and unfolded states.

According to a further aspect of the disclosure, each stiffening rib comprises an outer end arranged at the outer side edge and an inner end arranged at the inner section. The inner ends of the two or more stiffening ribs are connected to and pivotally arranged in relation to a hinge structure. The hinge structure is used for an easy operation of the partition structure between the folded and unfolded states. The stiffening ribs are connected to the hinge structure at the inner ends, and through the connection, the stiffening ribs are hingedly arranged in relation to each other around the hinge structure. The stiffening ribs can with this arrangement be rotated in relation to each other when the partition structure is being unfolded or folded.

According to an aspect of the disclosure, a first outer stiffening rib arranged along the first side edge is connected to the first connection member, and a second outer stiffening rib arranged along the second side edge is connected to the second connection member. The outer stiffening ribs are securing that the folding and unfolding operations of the partition structure is achieved in a simple and efficient way when one of the backrest structures is raised or lowered.

According to another aspect of the disclosure, each stiffening rib comprises one or more magnets arranged for holding the stiffening ribs in position in relation to adjacent stiffening ribs when the first backrest structure and the second backrest structure are arranged in the raised position, or arranged in the lowered position. The magnets are thus securing the stiffening ribs in relation to each other when the partition structure is in the folded state.

According to a further aspect of the disclosure, the system further comprises a reinforcement wire configured to extend between the first backrest structure and the second backrest structure. The reinforcement wire is strengthening the construction of the vehicle seat partitioning system, where the wire is increasing the capacity of preventing goods or objects from being displaced.

According to an aspect of the disclosure, a first end of the reinforcement wire is connected to the first connection member, and/or a second end of the reinforcement wire is connected to the second connection member. Through the connection of the wire ends to the connection members, the partition structure can be easily adjusted in different positions. The connection members are also anchoring the reinforcement wire to the track units.

According to another aspect of the disclosure, the first track unit is arranged on a first rear side of the first backrest structure and/or the second track unit is arranged on a second rear side of the second backrest structure. The arrangements of the track units on the rear sides are facilitating the adjustment of the partition structure in relation to the track units. The arrangement is further securing that the folding and unfolding operations are efficient through the adjustability of the partition structure.

According to a further aspect of the disclosure, the first connection member is connected to the first track unit via a first locking member arranged to lock the first connection member to the first track unit in two or more locking positions along the first track unit, and/or the second connection member is connected to the second track unit via a second locking member arranged to lock the second connection member to the second track unit in two or more locking positions along the second track unit. The locking members are used for conveniently positioning the connection members in relation to the track units.

According to an aspect of the disclosure, the partition structure is arranged as a flexible net structure. The net structure is providing an efficient and flexible structure suitable for holding cargo or objects in place. The net structure is easily folded and unfolded, and further lightweight in construction.

According to another aspect of the disclosure, the partition structure is configured to be removably attached to the first backrest structure and the second backrest structure. With the possibility to remove the partition structure, the partition structure can easily be stowed away when not used.

The disclosure further concerns a vehicle comprising a vehicle seat partitioning system as described above, where the vehicle comprises a vehicle seat unit with a first backrest structure, a second backrest structure, and a common seating structure. The first backrest structure and/or the second backrest structure are arranged to be foldable between a raised position and a lowered position in relation to the common seating structure. The partition structure is extended in an essentially longitudinal vehicle direction when the first backrest structure is arranged in the lowered position and the second backrest structure is arranged in a raised position; or when the second backrest structure is arranged in the lowered position and the first backrest structure is arranged in the raised position. The arrangement of the partition structure in the essentially longitudinal direction is separating the cargo area from the passenger area of the vehicle when the backrest structure is folded, wherein cargo or objects transported in the cargo area are prevented from entering the passenger area.

According to an aspect of the disclosure, the partition structure is movably arranged in relation to the backrest structure arranged in the lowered position between the essentially longitudinal vehicle direction and an angled position, where the angled position is a position between the essentially longitudinal vehicle direction and an essentially lateral vehicle direction. The movable arrangement is providing a flexible solution, where the partition structure can be moved to further increase the ability to prevent goods or objects from entering the passenger area of the vehicle.

BRIEF DESCRIPTION OF THE DRAWINGS

The disclosure will be described in detail in the following, with reference to the attached drawings, in which FIGS. 4A-4B show schematically, the partition structure according to the disclosure, and FIG. 5 shows schematically in a perspective view, a locking member according to the disclosure.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
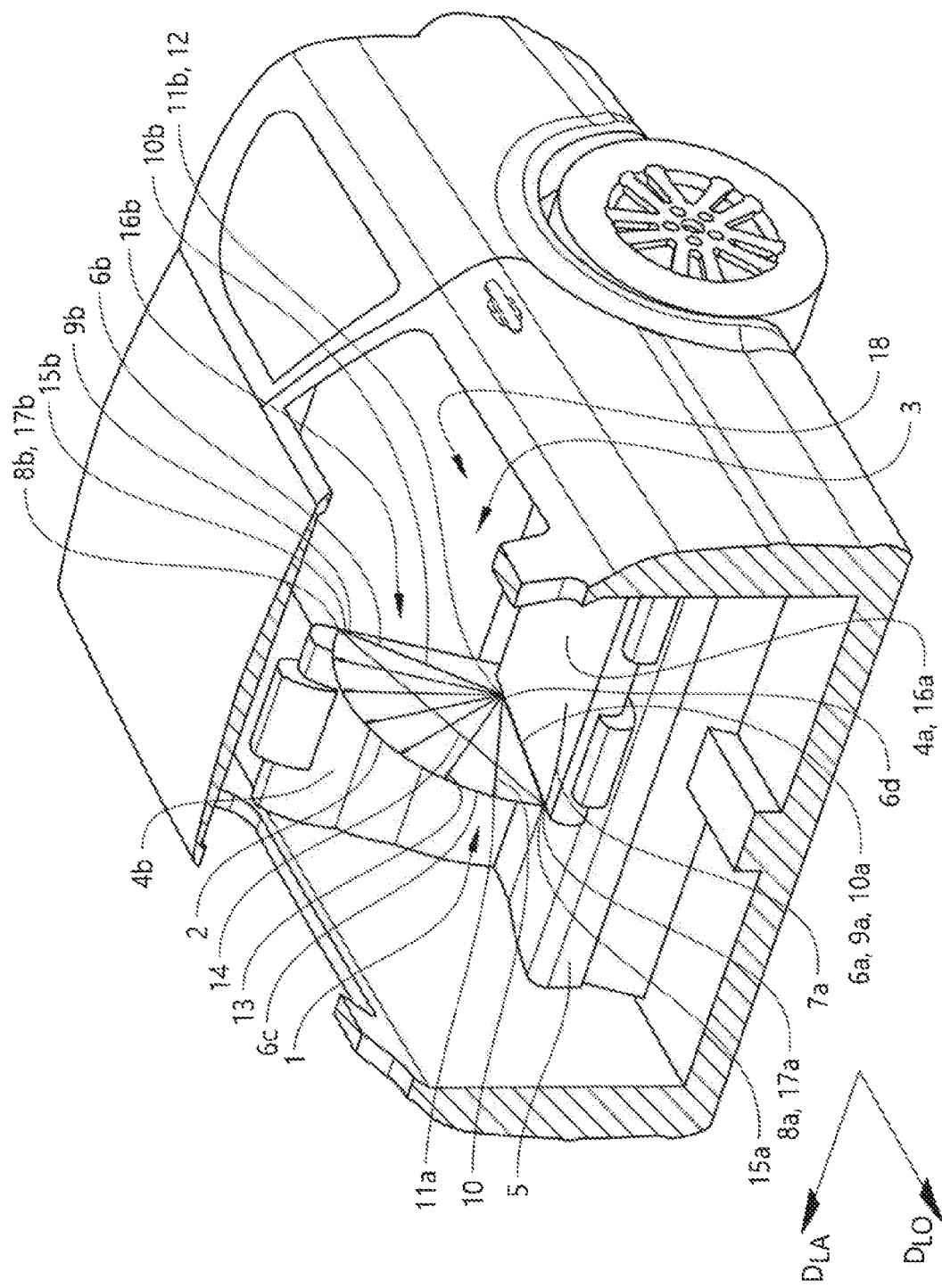
FIGS. 1A-1B show schematically in perspective views, a vehicle seat partitioning system with a partition structure according to the disclosure.
Figure 1B:
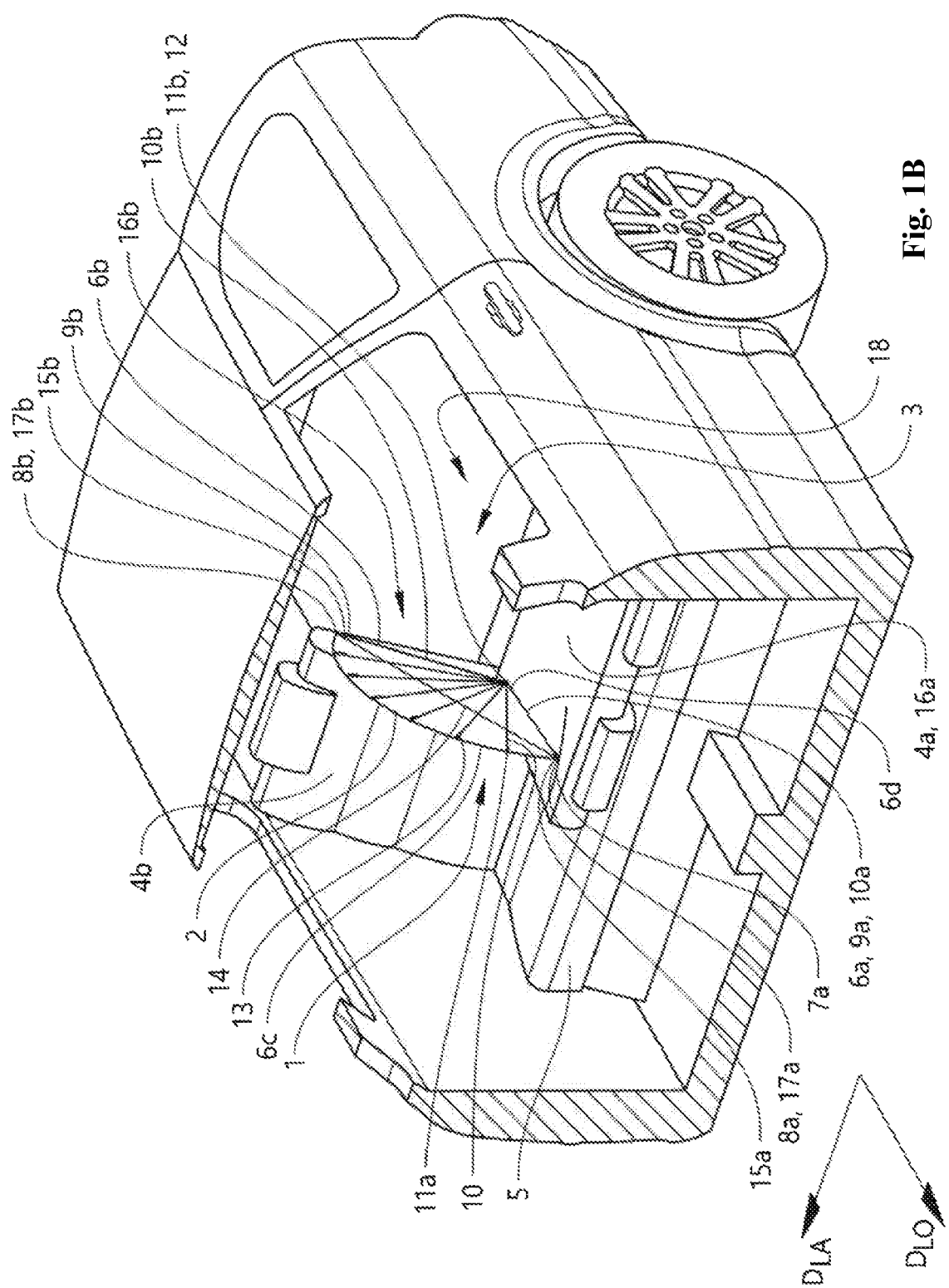

FIG. 1A schematically shows a vehicle seat partitioning system 1 according to the disclosure. As illustrated in the figure, the vehicle seat partitioning system 1 comprises a partition structure 2. The partition structure 2 is arranged for partitioning or dividing the interior structure of the vehicle when the vehicle is configured with a foldable backrest construction allowing a user of the vehicle to increase the cargo space for comfortable loading of the vehicle. The partition structure 2 is suitably used for preventing cargo from being shifted during transport, and preventing passengers of the vehicle from being hit by objects during transport or in a crash event.

The vehicle comprises a vehicle seat unit 3, and in the embodiment illustrated in FIG. 1A, the vehicle seat unit 3 is a rear vehicle seat construction with foldable backrests, where the vehicle seat unit 3 is arranged in connection to a rear vehicle cargo area 18. The vehicle seat unit 3 comprises a first backrest structure 4a, a second backrest structure 4b, and a common seating structure 5. The vehicle seating unit 3 may have any suitable conventional construction, where the first backrest structure 4a and/or the second backrest structure 4b are foldably arranged in relation to the seating structure 5. It should be understood that the vehicle seat unit 3 may comprise more than two foldable backrest structures depending on the construction of the vehicle, and two or more partition structures 2 may be used if suitable. Further, the vehicle seat unit 3 may be a front vehicle seat construction, or a vehicle seat construction arranged between a front and a rear seat construction.

Figure 2A:
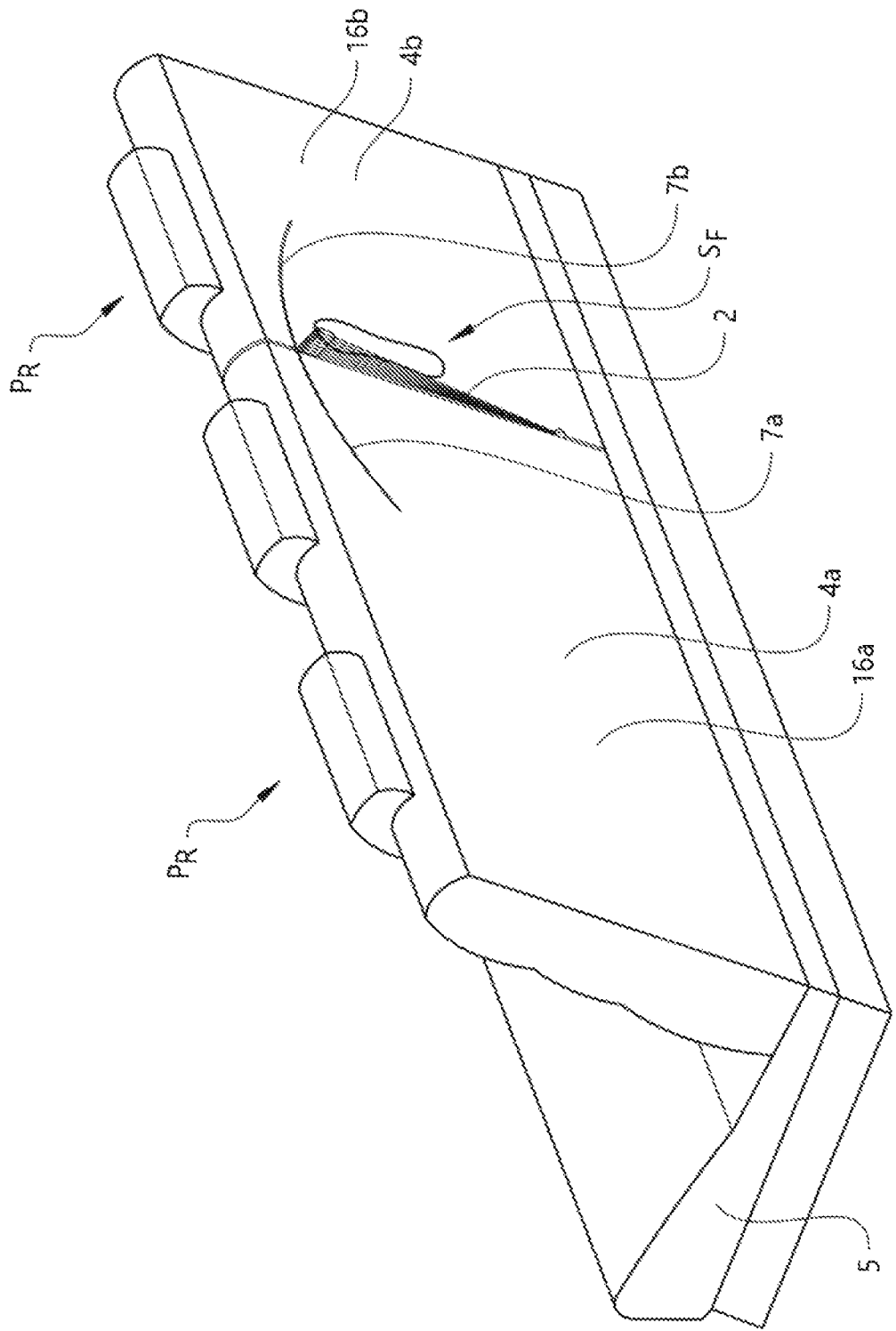
FIGS. 2A-2B show schematically in perspective views, a vehicle seat unit with the partition structure according to the disclosure.
Figure 2B:
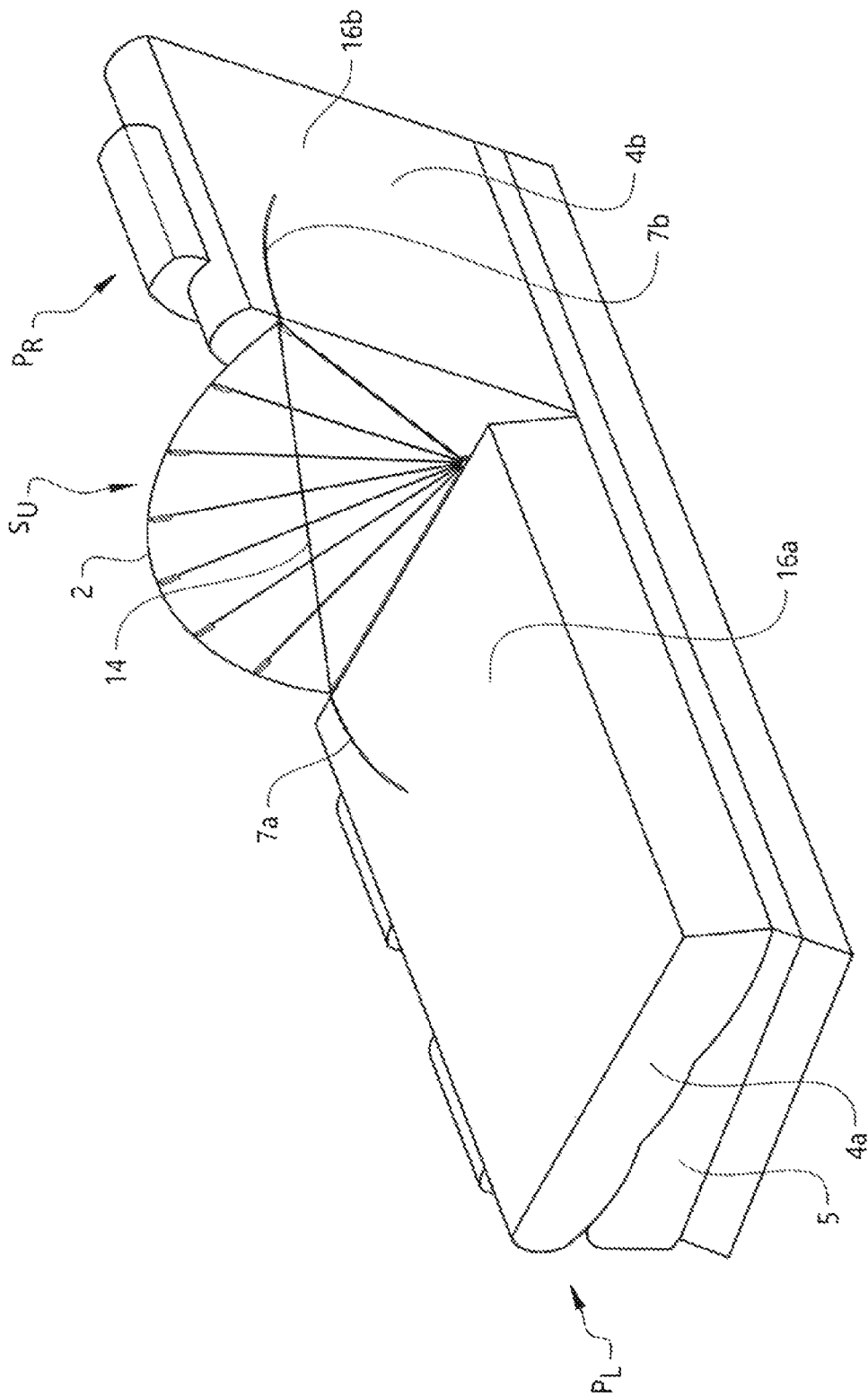

The first backrest structure 4a and/or the second backrest structure 4b are arranged to be foldable between a raised position $P_R$ and a lowered position $P_L$ in relation to the common seating structure 5, as schematically shown in FIGS. 2A-2B. In the raised position PR, as for example illustrated in FIG. 3A, the shown backrest structure 4 is arranged in a normal travelling position in which an occupant of the vehicle can be seated in the raised part or section of the vehicle seat unit 3. In the lowered position $P_L$, as for example illustrated in FIG. 3C, the shown backrest structure 4 is arranged in a folded position in relation to the seating structure 5, in which a rear side 16 of the backrest structure may be used as a cargo floor or similar arrangement for transporting goods or objects. To achieve the foldable configuration of the backrest structure 4, the backrest structure 4 suitably is hingedly connected to the seating structure 5. The backrest structure 4 may at a lower end be folded around a hinge or similar structure arranged in a conventional manner at a rear or front end of the seating structure 5.

Figures 3A, 3B:
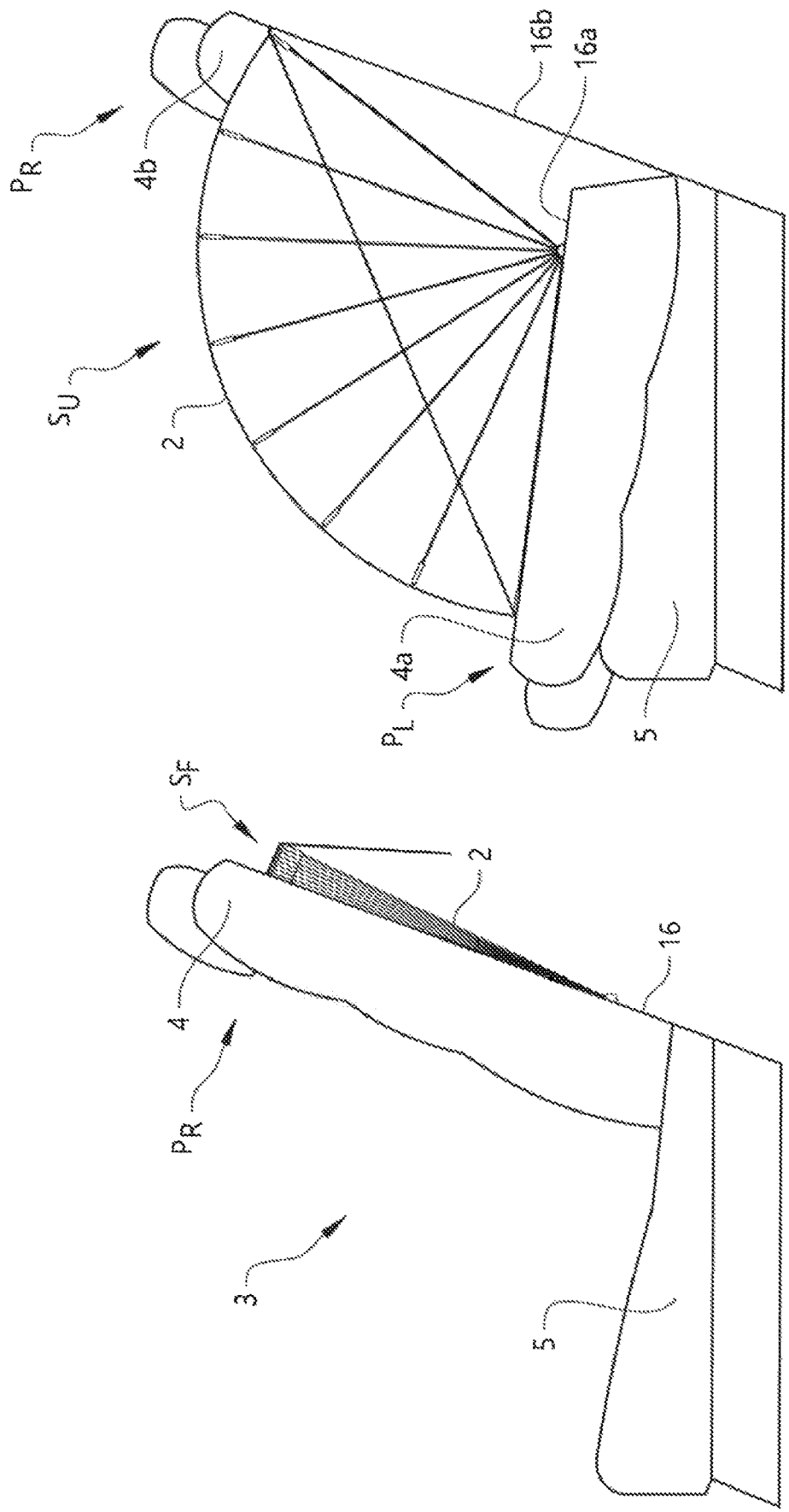
FIGS. 3A-3C show schematically in side views, the vehicle seat unit with the partition structure according to the disclosure.

When folding the vehicle backrest structure 4, there is a risk that an occupant travelling in the unfolded section of the vehicle seat unit 3 is being hit by objects. This is especially of concern if the objects are not secured properly. With the partition structure 2, the interior structure of the vehicle and the vehicle seat unit 3 is providing a safety arrangement for passengers travelling in the vehicle. The partition structure 2 is preventing goods or objects from hitting passengers in the vehicle during transport or in a crash event when the backrest structure 4 of the vehicle seat unit 3 is folded. In FIGS. 1A, 2A and 3B, the partition structure 2 is for illustrative purposes shown with the first backrest structure 4a in the lowered position PL and the second backrest structure 4b in the raised position $P_R$.

As illustrated in FIGS. 1A-3C, the partition structure 2 may be arranged as a flexible structure, such as a flexible net structure, a fabric structure or a structure of other suitable flexible materials, such as plastic materials or composite materials. The net structure may for example be made of a plastic net material or a reinforced plastic net material. The partition structure 2 is configured to be attached to the first backrest structure 4a and the second backrest structure 4b of the vehicle seat unit 3. The partition structure 2 comprises a first side edge 6a and a second side edge 6b, where the first side edge 6a is connected to the first backrest structure 4a and the second side edge 6b is connected to the second backrest structure 4b, as will be further described below.

Figure 3C:
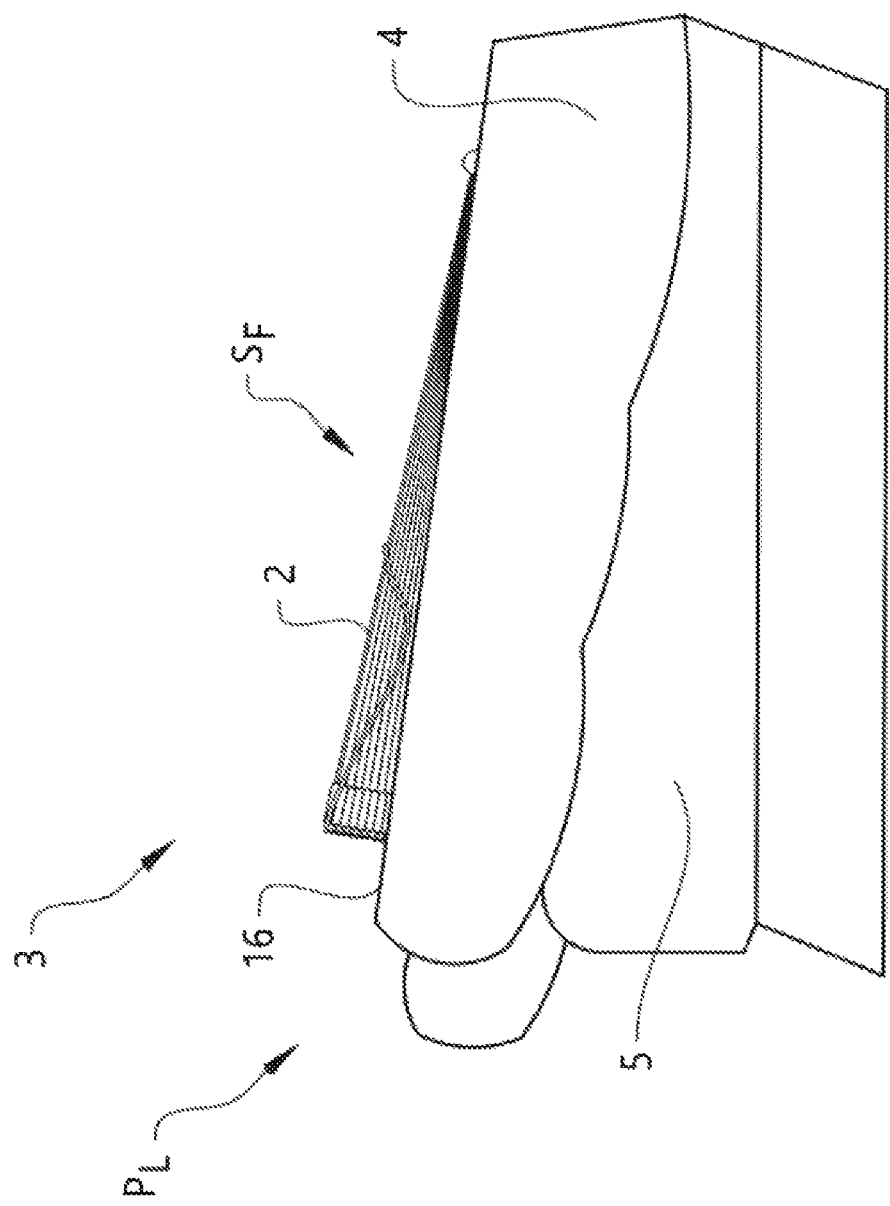

The respective side edges are suitably aligned with the respective backrest structures. The first side edge 6a is extending along a first backrest side edge 9a of the first backrest structure 4a, and the second side edge 6b is extending along a second backrest side edge 9b of the second backrest structure 4b, as illustrated in FIGS. 1A and 2A-2B. The first backrest side edge 9a and the second backrest side edge 9b are arranged in connection to each other when the first backrest structure 4a and the second backrest structure 4b are arranged in the raised position $P_R$, or arranged in the lowered position $P_L$. As shown in FIGS. 2A and 3A, when the first backrest structure 4a and the second backrest structure 4b both are in the raised position $P_R$ the first backrest structure 4a is arranged adjacent the second backrest structure 4b, and the first backrest side edge 9a and the second backrest side edge 9b are arranged in connection to each other where the backrest structures are separated from each other. Also when the first backrest structure 4a and the second backrest structure 4b are both in the lowered position $P_L$, as illustrated in FIG. 3C, the first backrest side edge 9a and the second backrest side edge 9b are arranged adjacent each other.

As illustrated in the figures, the partition structure 2 is arranged in a folded state SF when both the first backrest structure 4a and the second backrest structure 4b are arranged in the raised position $P_R$, or arranged in the lowered position $P_L$. The partition structure 2 is arranged in an unfolded state $S_U$ when the first backrest structure 4a is arranged in the raised position $P_R$ and the second backrest structure 4b is arranged in the lowered position PL, or alternatively when the first backrest structure 4a is arranged in the lowered position PL and the second backrest structure 4b is arranged in the raised position PR.

When folding one of the backrest structures in relation to the other backrest structure 2 from the raised position $P_R$ to the lowered position $P_L$, the partition structure is through the connection to the backrest structures following the folding movement of the backrest structure. During the folding movement of one of the backrest structures in relation to the other, the partition structure 2 unfolds from the folded state $S_F$ to the unfolded state $S_U$, as schematically illustrated in FIGS. 3A-3B. The first side edge 6a of the partition structure 2 is through the attachment to the first backrest structure 4a following the first backrest structure 4a when moved between the raised and lowered positions. When the first backrest structure 4a is lowered from the raised position $P_R$ to the lowered position $P_L$ and the second backrest structure 4b is maintained in the raised position, the first side edge 6a moves with the first backrest structure 4a, and unfolds the partition structure 2 from the folded state $S_F$ to the unfolded state $S_U$. When the first backrest structure 4a is raised from the lowered position $P_L$ to the raised position $P_R$, the first side edge 6a moves with the first backrest structure 4a, and folds the partition structure 2 from the unfolded state $S_U$ to the folded state $S_F$. In a similar way, the second side edge 6b of the partition structure 2 is through the attachment to the second backrest structure 4b following the second backrest structure 4b when moved between the raised or lowered positions. When the second backrest structure 4b is lowered from the raised position $P_R$ to the lowered position $P_L$ and the first backrest structure 4a is maintained in the raised position, the second side edge 6b moves with the second backrest structure 4b, and unfolds the partition structure 2 from the folded state $S_F$ to the unfolded state $S_U$. When the second backrest structure 4b is raised from the lowered position $P_L$ to the raised position $P_R$, the second side edge 6b moves with the second backrest structure 4b, and folds the partition structure 2 from the unfolded state SU to the folded state SF.

The partition structure 2 may be configured with a flexible fan-like configuration, where the partition structure 2 comprises two or more stiffening ribs 10. In the illustrated embodiments, the partition structure 2 has a flexible fan-like configuration, and comprises a plurality of stiffening ribs 10. The stiffening ribs 10 are extending between an outer side edge 6c of the partition structure 2 and an inner section 6d of the partition structure 2, where the inner section 6d is connecting the first side edge 6a and the second side edge 6b, as shown in FIGS. 1A, 2B, 3B, and 4A. The inner section 6d may for example be a corner portion of the partition structure 2 connecting the first side edge 6a and the second side edge 6b. The stiffening ribs 10 provide stability to the partition structure 2, and the stiffening ribs 2 are further preventing goods from being displaced. The flexible fan-like configuration with the stiffening ribs 10 is further providing a construction and design that is simple to arrange between the folded state $S_F$ and the unfolded state $S_U$.

Each stiffening rib 10 comprises an outer end 11a arranged at the outer side edge 6c and an inner end 11b arranged at the inner section 6d. The inner ends 11b of the two or more stiffening ribs 10 are connected to and pivotally arranged in relation to a hinge structure 12. The hinge structure 12 may be of any suitable configuration where the inner ends 11b of the stiffening ribs 10 may rotate around, such as a rod or other pivotal structure. The hinge structure 12 or the inner section 6d may suitably be anchored to the vehicle seat unit 3. It may be possible to arrange the partition structure 2 without the hinge structure 12 if suitable depending on the construction of the partition structure 2.

Figure 4A:
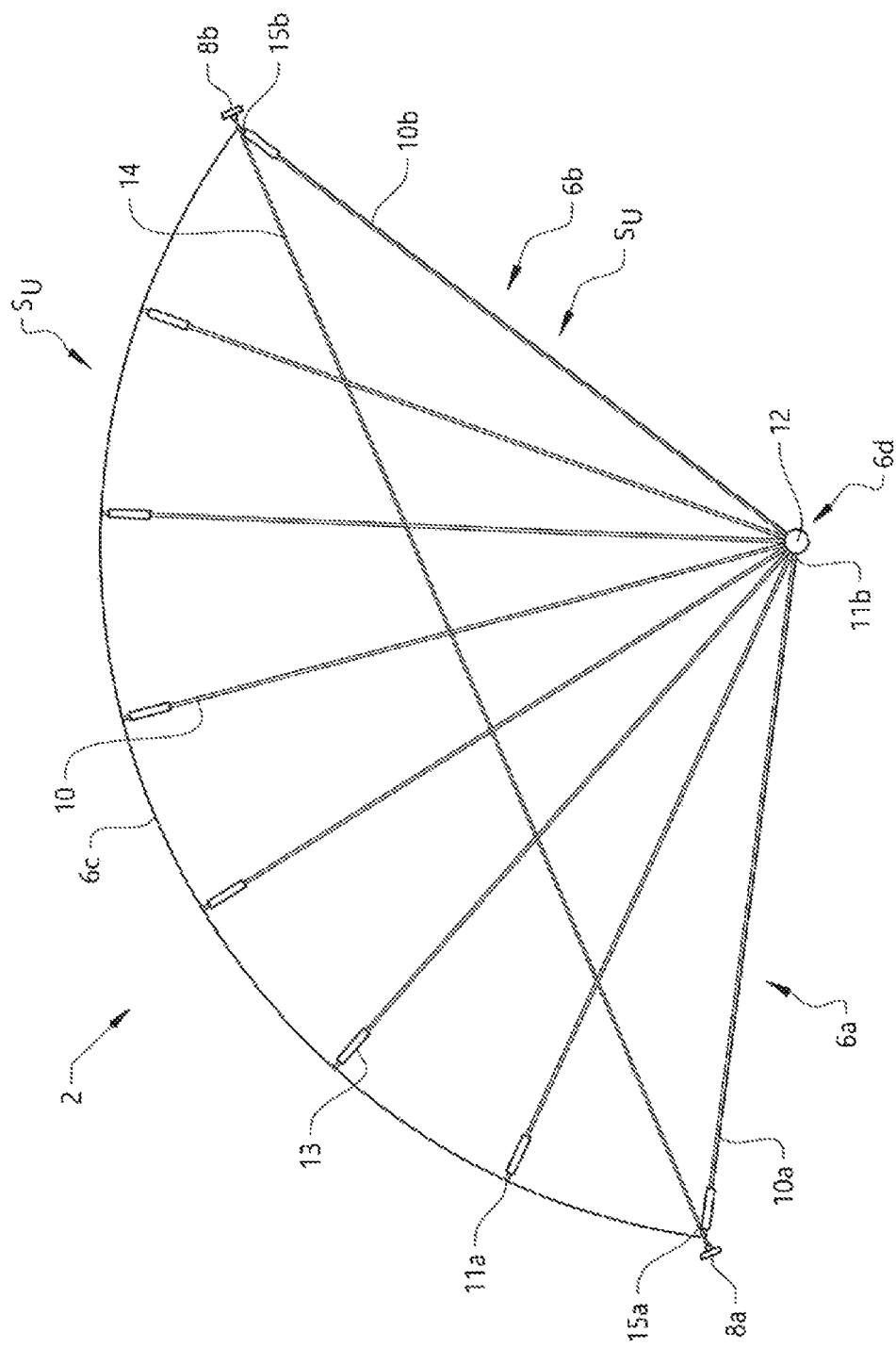

As illustrated in FIG. 4A, a first outer stiffening rib 10a is arranged along the first side edge 6a of the partition structure 2, and a second outer stiffening rib 10b is arranged along the second side edge 6b of the partition structure 2. The first outer stiffening rib 10a may be connected to a first connection member 8a, and second outer stiffening rib 10b may be connected to a second connection member 8b. The connection members are used for connecting the partition structure 2 to the backrest structures as will be further described below. The outer stiffening ribs are securing that the folding and unfolding operations of the partition structure 2 is achieved in a simple and efficient way, and they are further providing a stiff connection to the respective backrest structures to which they are connected. The outer stiffening ribs are also providing a secure alignment of the side edges of the partition structure 2 to the backrest side edges.

Each stiffening rib 10 may comprise one or more magnets 13 arranged for holding the stiffening ribs 10 in position in relation to adjacent stiffening ribs 10, when the partition structure 2 is arranged in the folded state $S_F$. The magnets are securing the stiffening ribs in relation to each other when the partition structure is in the folded state $S_F$. In the embodiment shown in the figures, each stiffening rib 10 is provided with one magnet 13, where the magnet 13 on each stiffening rib 10 is interacting with other magnets 13 of adjacent stiffening ribs 10 in the folded state $S_F$. The magnets 13 may have any suitable construction or design, such as for example elongated pieces of permanent magnets attached to each stiffening rib 10 with an orientation where the magnets 13 cooperate with adjacent magnets 13 in the folded state. When the partition structure 2 is attached to the backrest structures, the magnets 13 are thus holding the stiffening ribs 10 in position in relation to adjacent stiffening ribs 10 when both the first backrest structure 4a and the second backrest structure 4b are arranged in the raised position $P_R$, or arranged in the lowered position $P_L$.

To further increase the cargo holding capacity of the partition structure 2, the system 1 further comprises a reinforcement wire 14 configured to extend between the first backrest structure 4a and the second backrest structure 4b when the partition structure is attached to the vehicle seat unit 3. In the shown embodiment, as for example illustrated in FIG. 4A, a first end 15a of the reinforcement wire 14 is connected to the first connection member 8a, and a second end 15b of the reinforcement wire 14 is connected to the second connection member 8b. It would be possible depending on the design of the partition structure to arrange only one connection member to one end of the reinforcement wire 14. The reinforcement wire 14 is stabilizing the construction of the system 1, and the reinforcement wire 14 is increasing the capacity of preventing goods or objects from being displaced during transport. In order to provide a robust construction of the partition member 2, the first end 15a of the reinforcement wire 14 may further be attached to the first outer stiffening rib 10a, and the second end 15b of the reinforcement wire 14 may further be attached to the second outer stiffening rib 10b. The reinforcement wire may be made of any suitable material, such as for example a steel wire, a plastic wire, a fibre reinforced plastic wire, or a wire made of a combination of materials.

The system 1 may further comprise a first track unit 7a arranged on the first backrest structure 4a and/or a second track unit 7b arranged on the second backrest structure 4b. In the embodiment shown in FIGS. 1A-1B and 2A-2B, the system 1 comprises a first track unit 7a arranged on the first backrest structure 4a and a second track unit 7b arranged on the second backrest structure 4b. The first track unit 7a is arranged on a first rear side 16a of the first backrest structure 4a and/or the second track unit 7b is arranged on a second rear side 16b of the second backrest structure 4b. The track units may have any suitable configuration for holding the partition structure 2, where the partition structure 2 may be displaced in different positions in relation to the track units. As an example, the track units may have an elongated configuration with a U-shaped cross-sectional configuration as schematically shown in FIG. 5. However, other configurations are also possible. The extension of the track units may be different for different vehicle seat units, and the track units may have a curved shape along the rear sides of the backrest structures as schematically illustrated in the figures.

The partition structure 2 is arranged to extend in an essentially longitudinal vehicle direction $D_{LO}$ when the first backrest structure 4a is arranged in the lowered position $P_L$ and the second backrest structure 4b is arranged in the raised position $P_R$, or when the second backrest structure 4b is arranged in the lowered position $P_L$ and the first backrest structure 4a is arranged in the raised position $P_R$. In the configuration illustrated in FIG. 1A, the first backrest structure 4a is arranged in the lowered position $P_L$ and the second backrest structure 4b is arranged in the raised position $P_R$. The partition structure 2 is in the unfolded state $S_U$. As shown in FIG. 1A, the partition structure 2 is extending in the essentially longitudinal vehicle direction $D_{LO}$, preventing goods or objects from entering the section of the vehicle seat unit 3, where the second backrest structure 4b is in the raised position $P_R$.

The partition structure 2 may be movably arranged in relation to the backrest structure arranged in the lowered position $P_L$ between the essentially longitudinal vehicle direction $D_{LO}$ and an angled position $P_A$, where the angled position $P_A$ is a position between the essentially longitudinal vehicle direction $D_{LO}$ and an essentially lateral vehicle direction $D_{LA}$. In the configuration of the partition structure 2 illustrated in FIG. 1B, the partition structure 2 is arranged in the angled position $P_A$. In the angled position $P_A$, the partition structure 2 is moved into a position where it is preventing passengers of the vehicle from being hit by objects during transport or in a crash event. Through the displacement of the partition structure 2 into the angled position $P_A$, a flexible solution is provided where goods or objects of different sizes and shapes can be prevented from being moved during transport.

The first side edge 6a of the partition structure 2 may comprise the first connection member 8a. The first connection member 8a may as described above, be connected to the first outer stiffening rib 10a or to the first end 15a of the reinforcement wire 14 depending on the design of the partition structure 2. The second side edge 6b of the partition structure 2 may comprise the second connection member 8b. The second connection member 8b may as described above, be connected to the second outer stiffening rib 10b or to the second end 15b of the reinforcement wire 14 depending on the design of the partition structure 2. The first connection member 8a may be connected to and movably arranged in relation to the first track unit 7a and the second connection member 8b may be connected to and movably arranged in relation to the second track unit 7b.

As illustrated in FIG. 5, the first connection member 8a and the second connection member 8b may each be arranged with an outer part 19a and an inner part 19b. The inner part 19b may be provided with an opening 20 or similar arrangement for attachment of the reinforcement wire or the outer stiffening rib to the connection member. Carabineers, hooks or other attachment members may be used for connecting the reinforcement wire 14 to the opening 20. The outer part 19a is configured to cooperate with the respective track units, where the outer part 19a is arranged to slide along the track unit and positioned in different positions in relation to the track unit.

The first connection member 8a may be connected to the first track unit 7a via a first locking member 17a arranged to lock the first connection member 8a to the first track unit 7a in two or more locking positions along the first track unit 7a. The second connection member 8b may be connected to the second track unit 7b via a second locking member 17b arranged to lock the second connection member 8b to the second track unit 7b in two or more locking positions along the second track unit 7b.

As shown in FIG. 5, the first locking member 17a may be configured as protrusions 21 or similar means arranged on the outer part 19a of the first connection member 8a and cooperating recesses 22 or similar means on the first track unit 7a. The protrusions 21 and recesses 22 are when engaged locking the first connection member 8a to the first track unit 7a. In a similar way, the second locking member 17b may be configured as protrusions 21 or similar means arranged on the outer part 19a of the second connection member 8b and cooperating recesses 22 or similar means on the second track unit 7b. The protrusions 21 and recesses 22 are when engaged locking the second connection member 8b to the second track unit 7b.

The protrusions 21 and recesses 22 may have matching shapes for securing the connection members to the track units, and they may for example have matching saw-tooth-like shapes or other suitable shapes. The track units may be provided with recesses 22 along the whole length or along a part of the track units. The locking members may each be provided with at least one spring 23, where the at least one spring 23 is positioning the protrusions 21 in relation to the recesses 22. As schematically shown in FIG. 5, the spring 23 is pushing the protrusions 21 of the connection member towards the recesses 22 in the track unit, which is providing a firm connection between the connection member and the track unit through the engagement between the protrusions 21 and recesses 22. When positioning the connection members in relation to the track unit, the connection member is pushed in a direction where the protrusions 21 are disengaged from the recesses 22 against the force of the spring 23. When the protrusions 21 are disengaged from the recesses 22, the connection member is free to slide along the track unit to a desired position where the connection member is released for engagement between the protrusions 21 and recesses 22. It is also possible to arrange the track units and connection members with other types of spring loaded locking members. In an alternative design, the protrusions may instead be arranged on the track units and the recesses on the connection members.

The partition structure 2 may be removably attached to the first backrest structure 4a and the second backrest structure 4b. The partition structure may be provided with suitable attachment means, such as the connection members described above, for releasable attachment to the track units and backrest structures. Through the removable arrangement, the partition structure can be stored when not used.

It should be understood that the partition structure 2 could have any suitable shape or configuration. In the shown embodiments, the partition structure 2 is schematically illustrated with a quarter-circle-like shape. However, shapes such as for example triangular, rectangular, square, and other polygonal or curved shapes are also possible.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle seat partitioning system
2: Partition structure

3: Vehicle seat unit
4: Backrest structure
4a: First backrest structure
4b: Second backrest structure
5: Seating structure
6a: First side edge, Partition structure
6b: Second side edge, Partition structure
6c: Outer side edge, Partition structure
6d: Inner section, Partition structure
7a: First track unit
7b: Second track unit
8a: First connection member
8b: Second connection member
9a: First backrest side edge
9b: Second backrest side edge
10: Stiffening ribs
10a: First outer stiffening rib
10b: Second outer stiffening rib
11a: Outer end, Stiffening ribs
11b: Inner end, Stiffening ribs
12: Hinge structure
13: Magnet
14: Reinforcement wire
15a: First end, Reinforcement wire
15b: Second end, Reinforcement wire
16: Rear side
16a: First rear side, First backrest structure
16b: Second rear side, Second backrest structure
17a: First locking member
17b: Second locking member
18: Vehicle cargo area
19a: Outer part
19b: Inner part
20: Opening
21: Protrusion
22: Recess
23: Spring

What is claimed is:

1. A vehicle seat partitioning system comprising a partition structure, wherein the partition structure is configured to be attached to a first backrest structure and a second backrest structure of a vehicle seat unit, wherein the first backrest structure and/or the second backrest structure are arranged to be foldable between a raised position and a lowered position in relation to a common seating structure, wherein the partition structure comprises a first side edge and a second side edge, wherein the first side edge is configured to be connected to the first backrest structure and the second side edge is configured to be connected to the second backrest structure,
wherein the system further comprises a first track unit configured to be arranged on the first backrest structure and/or a second track unit configured to be arranged on the second backrest structure, wherein the first side edge comprises a first connection member connected to and movably arranged in relation to the first track unit and/or the second side edge comprises a second connection member connected to and movably arranged in relation to the second track unit,
wherein the first track unit is arranged on a first rear side of the first backrest structure and/or the second track unit is arranged on a second rear side of the second backrest structure.

2. A vehicle seat partitioning system according to claim 1, wherein the first side edge is configured to extend along a first backrest side edge of the first backrest structure, and wherein the second side edge is configured to extend along a second backrest side edge of the second backrest structure, wherein the first backrest side edge and the second backrest side edge are arranged in connection to each other when the first backrest structure and the second backrest structure are arranged in the raised position, or arranged in the lowered position.

3. A vehicle seat partitioning system according to claim 1, wherein the partition structure is configured to be arranged in a folded state when the first backrest structure and the second backrest structure are arranged in the raised position, or arranged in the lowered position.

4. A vehicle seat partitioning system according to claim 1, wherein the partition structure is configured to be arranged in an unfolded state when the first backrest structure is arranged in the raised position and the second backrest structure is arranged in the lowered position, or when the first backrest structure is arranged in the lowered position and the second backrest structure is arranged in the raised position.

5. A vehicle seat partitioning system according to claim 1, wherein the partition structure has a flexible fan-like configuration, wherein the partition structure comprises two or more stiffening ribs, wherein the stiffening ribs are extending between an outer side edge of the partition structure and an inner section of the partition structure, wherein the inner section is connecting the first side edge and the second side edge.

6. A vehicle seat partitioning system according to claim 5, wherein each stiffening rib comprises an outer end arranged at the outer side edge and an inner end arranged at the inner section, wherein the inner ends of the two or more stiffening ribs are connected to and pivotally arranged in relation to a hinge structure.

7. A vehicle seat partitioning system according to claim 5, wherein a first outer stiffening rib arranged along the first side edge is connected to the first connection member, and a second outer stiffening rib arranged along the second side edge is connected to the second connection member.

8. A vehicle seat partitioning system according to claim 5, wherein each stiffening rib comprises one or more magnets arranged for holding the stiffening ribs in position in relation to adjacent stiffening ribs when the first backrest structure and the second backrest structure are arranged in the raised position, or arranged in the lowered position.

9. A vehicle seat partitioning system according to claim 1, wherein the system further comprises a reinforcement wire configured to extend between the first backrest structure and the second backrest structure.

10. A vehicle seat partitioning system according to claim 9, wherein a first end of the reinforcement wire is connected to the first connection member, and/or a second end of the reinforcement wire is connected to the second connection member.

11. A vehicle seat partitioning system according to claim 1, wherein the first connection member is connected to the first track unit via a first locking member arranged to lock the first connection member to the first track unit in two or more locking positions along the first track unit, and/or the second connection member is connected to the second track unit via a second locking member arranged to lock the second connection member to the second track unit in two or more locking positions along the second track unit.

12. A vehicle seat partitioning system according to claim 1,
wherein the partition structure is arranged as a flexible net structure.

13. A vehicle seat partitioning system according to claim 1,
wherein the partition structure is configured to be removably attached to the first backrest structure and the second backrest structure.

14. A vehicle comprising a vehicle seat partitioning system according to claim 1,
wherein the vehicle comprises a vehicle seat unit with a first backrest structure, a second backrest structure, and a common seating structure, wherein the first backrest structure and/or the second backrest structure are arranged to be foldable between a raised position and a lowered position in relation to the common seating structure, wherein the partition structure is extended in an essentially longitudinal vehicle direction when the first backrest structure is arranged in the lowered position and the second backrest structure is arranged in a raised position; or when the second backrest structure is arranged in the lowered position and the first backrest structure is arranged in the raised position.

15. A vehicle according to claim 14,
wherein the partition structure is movably arranged in relation to the backrest structure arranged in the lowered position between the essentially longitudinal vehicle direction and an angled position, wherein the angled position is a position between the essentially longitudinal vehicle direction and an essentially lateral vehicle direction.

* * * * *